(12) United States Patent
Xiang et al.

(10) Patent No.: US 10,521,055 B2
(45) Date of Patent: Dec. 31, 2019

(54) TERMINAL, METHOD, APPARATUS AND ELECTRONIC DEVICE FOR IDENTIFYING TOUCH

(71) Applicant: Beijing Xiaomi Mobile Software Co., Ltd., Haidian District, Beijing (CN)

(72) Inventors: Ji Xiang, Beijing (CN); Yuan Gao, Beijing (CN); Hongtu Cui, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 64 days.

(21) Appl. No.: 15/717,142

(22) Filed: Sep. 27, 2017

(65) Prior Publication Data

US 2018/0088697 A1   Mar. 29, 2018

Related U.S. Application Data

(63) Continuation of application No. PCT/CN2016/100808, filed on Sep. 29, 2016.

(51) Int. Cl.
G06F 3/043   (2006.01)

(52) U.S. Cl.
CPC .................. *G06F 3/043* (2013.01)

(58) Field of Classification Search
None
See application file for complete search history.

(56) References Cited

U.S. PATENT DOCUMENTS

| 2010/0231558 A1* | 9/2010 | Kwak ................ G06F 1/1626 345/179 |
|---|---|---|
| 2011/0300845 A1 | 12/2011 | Lee |
| 2014/0029384 A1 | 1/2014 | Dahl et al. |
| 2014/0152121 A1 | 6/2014 | Ku |

(Continued)

FOREIGN PATENT DOCUMENTS

| CN | 102540191 A | 7/2012 |
| CN | 103873699 A | 6/2014 |

(Continued)

OTHER PUBLICATIONS

Extended European Search Report issued in corresponding European Application No. 17193942.4, dated Feb. 8, 2018, 7 pages.

(Continued)

*Primary Examiner* — Kenneth B Lee, Jr.

(74) *Attorney, Agent, or Firm* — Arch & Lake LLP

(57) ABSTRACT

The present disclosure relates to a terminal, a method, an apparatus and an electronic device for determining a mode of operation. In some aspects, the terminal includes: an ultrasonic wave emitter, an ultrasonic wave signal path and a microphone. The ultrasonic wave emitter is arranged inside the terminal, a first hole is arranged on a side-frame of the terminal for accommodating the microphone, an ultrasonic wave signal emitted by the ultrasonic wave emitter propagates from inside of the terminal to a surface of the terminal via the ultrasonic wave signal path, the microphone is configured to receive an ultrasonic echo signal of the ultrasonic wave signal, and to determine whether the terminal is touched according to the ultrasonic echo signal.

15 Claims, 8 Drawing Sheets

(56) References Cited

U.S. PATENT DOCUMENTS

| | | | | |
|---|---|---|---|---|
| 2015/0261033 A1* | 9/2015 | Shin | ............... | H05K 5/0086 |
| | | | | 349/58 |
| 2016/0026340 A1 | 1/2016 | Dahl et al. | | |
| 2016/0154535 A1* | 6/2016 | Kavli | ............... | G06F 1/3231 |
| | | | | 345/177 |
| 2016/0246449 A1* | 8/2016 | Jarske | ............... | G06F 3/0436 |

FOREIGN PATENT DOCUMENTS

| | | |
|---|---|---|
| CN | 104935749 A | 9/2015 |
| CN | 105282320 A | 1/2016 |
| EP | 2922282 A1 | 9/2015 |
| JP | 2006050505 A | 2/2006 |
| JP | 2006332726 A | 12/2006 |
| WO | 2012131355 A1 | 10/2012 |
| WO | 2014125294 A1 | 8/2014 |

OTHER PUBLICATIONS

International Search Report (including English translation) issued in corresponding International Application No. PCT/CN2016/100808, dated Jul. 11, 2017, 8 pages.

\* cited by examiner

TERMINAL, METHOD, APPARATUS AND ELECTRONIC DEVICE FOR IDENTIFYING TOUCH

CROSS REFERENCE TO RELATED APPLICATION

This application is based upon and claims a priority to International Patent Application Serial No. PCT/CN2016/100808, filed with the Status Intellectual Property Office of P. R. China on Sep. 29, 2016, the entire contents of which are incorporated herein by reference.

TECHNICAL FIELD

The present disclosure relates to the field of electronic technology, and more particularly, to a terminal, a method, an apparatus, and an electronic device for identifying a touch.

BACKGROUND

Currently, cell phones, smartphones, and other devices, generally include a proximity sensor for determining the presence of objects nearby or for identifying when the device is being used. The proximity sensor typically includes an infrared diode and a photosensitive diode. The infrared diode emits an infrared light wave, which may then be detected by the photosensitive diode when reflected from the face, hair or other body part of a user. In particular, the reflected light wave may be transformed to an electric signal by the photosensitive diode, and then the electric signal is transformed into a digital signal by a photo diode amplifier. Based on the digital signal, it may be identified whether the device is being held for calling so as to, for example, determine whether to lock or unlock a display screen of the smartphone. As appreciated, proximity sensor technologies require integrated circuits for both the infrared diode and the photosensitive diode to be attached to a printed circuit board (PCB) of the smartphone. Furthermore, the front glass of the smartphone must be drilled, thereby occupying valuable display screen area.

SUMMARY

The present disclosure overcomes the shortcomings of previous methods by providing a novel approach to determining activation or operation of a device by a user. That is, rather than relying on proximity sensors used by prior technologies, the present approach makes use of ultrasonic wave signals and echoes to determine whether a device is being operated, activated, or generally in contact with, or proximate, to a user or object. Based on measured ultrasonic echo signals, various features of the device may be controlled, such as a display screen, or a lockout function. Features and advantages of the present disclosure will be apparent from description below.

In accordance with one aspect of the present disclosure, a terminal is provided. The terminal includes an ultrasonic wave emitter arranged inside the terminal that is configured to generate an ultrasonic wave signal. The terminal also includes an ultrasonic wave signal path connected to the ultrasonic wave emitter allowing the ultrasonic wave signal to propagate to the exterior of the terminal. The terminal also includes at least one microphone configured to receive an ultrasonic echo signal produced by the ultrasonic wave signal using a first hole is arranged on a side-frame of the terminal and a processor configured to analyze the received ultrasonic echo signal to determine a mode of operation of the terminal.

In accordance with another aspect of the present disclosure, a method for operating a terminal is provided. The method includes controlling an ultrasonic wave signal, generated by an ultrasonic wave emitter of a terminal, to propagate along an ultrasonic wave signal path at least partially to an exterior of the terminal and receiving an ultrasonic echo signal produced by the ultrasonic wave signal using at least one microphone of the terminal. The method also includes analyzing the ultrasonic echo signal to determine a mode of operation of the terminal.

In accordance with another aspect of the present disclosure an apparatus is provided. The apparatus includes a first controlling module, configured to control an ultrasonic wave signal emitted by an ultrasonic wave emitter to propagate from inside of a terminal to a surface of the terminal via an ultrasonic wave signal path. The apparatus also includes a second controlling module, configured to control a microphone to receive an ultrasonic echo signal of the ultrasonic wave signal, and a determining module, configured to determine whether the terminal is touched according to the ultrasonic echo signal.

In accordance with yet another aspect of the present disclosure an electronic device is provided. The electronic devices includes a processor, a memory configured to store non-transitory instructions executable by the processor, an ultrasonic wave emitter configured to produce an ultrasonic wave signal in a set frequency, and at least one microphone configured to receive ultrasonic echo signal due to the ultrasonic wave signal. The processor is configured to control the ultrasonic wave emitter to generate an ultrasonic wave signal that propagates along an ultrasonic wave signal path connecting the ultrasonic wave emitter with an exterior the electronic device. The processor is also configured to control a microphone to receive an ultrasonic echo signal based on the ultrasonic wave signal, and analyze the ultrasonic wave signal to determine a mode of operation of the electronic device.

In accordance with yet another aspect of the present disclosure, a non-transitory computer-readable storage medium is provided. The medium has stored therein instructions that, when executed by a processor of a device, causes the device to perform a method for identifying a touch. The method includes controlling an ultrasonic wave signal emitted by an ultrasonic wave emitter to propagate from inside of a terminal to a surface of the terminal via an ultrasonic wave signal path, and controlling a microphone to receive an ultrasonic echo signal of the ultrasonic wave signal. The method also includes determining whether the terminal is touched according to the ultrasonic echo signal.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

DETAILED DESCRIPTION

The present disclosure introduces a novel approach for determining whether a terminal or device is being operated, activated, or generally in contact with, or proximate, to a user or object. In particular, non-limiting devices and methods are introduced herein that make use of ultrasonic wave signals and echoes to identify use and control various components and operational features, such as a display screen or a lockout function of a device.

Figure 1A:
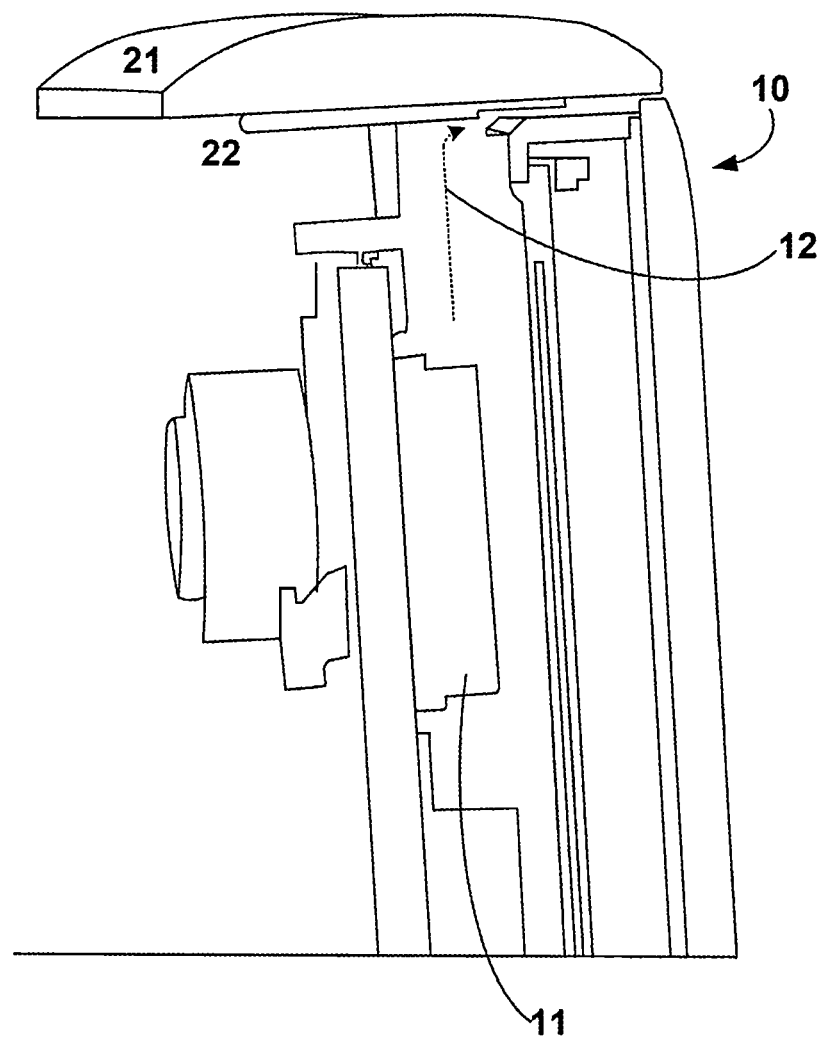
FIG. 1A is a partial perspective view illustrating a terminal according to an exemplary embodiment.

Referring specifically to FIG. 1A, a partial perspective view of a terminal 10, according to an embodiment of the present disclosure, is shown. The terminal 10 may be any electronic device having a touch-control function, as well as other features and functionalities. Non-limiting examples of the terminal 10 include smartphones, as shown in FIG. 1B, as well as tablets, laptops and other devices.

In some configurations, the terminal 10 may include, among other elements, an ultrasonic wave emitter 11 and at least one microphone encased partially, or completely, in a housing. The ultrasonic wave emitter 11 is configured to emit one or more ultrasonic wave signals that can propagate at least partially to an exterior 21 of the terminal 10 along one or more ultrasonic wave signal paths. Ultrasonic wave signal paths may include air-based or material-based signal pathways. The microphone(s) of the terminal 10 may be configured to detect ultrasonic wave echoes generated from the emitted ultrasonic wave signals. To this end, the terminal 10 may include a number of openings, holes, or seams in its housing or frame, allowing ultrasonic wave signals to travel between an interior 22 and exterior 21 of the terminal 10.

Figure 1B:
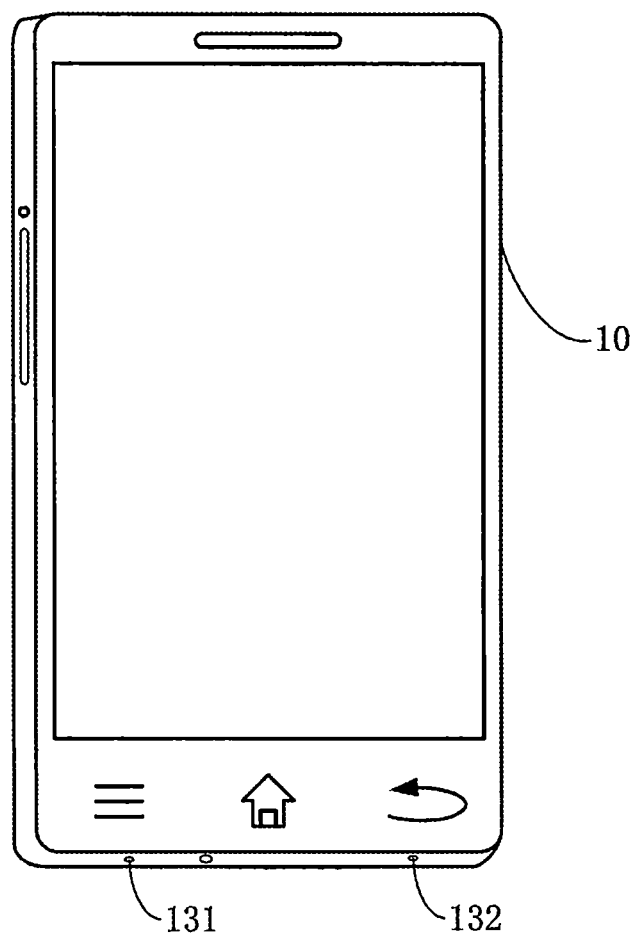
FIG. 1B is a schematic diagram illustrating a location of a first hole on a terminal shown in FIG. 1A according to an exemplary embodiment.

FIG. 1B illustrates an example embodiment of the terminal 10 described with reference to FIG. 1A. As shown, the terminal 10 may include a first microphone 131 and a second microphone 132 accessing the exterior 21 of the terminal 10 using respective openings in the housing. Although particular arrangements are shown in FIG. 1B for the microphones and their respective openings in the housing, it may be readily appreciated that variations are possible with the respect to the number of microphones and openings, as well as their respective positions in the terminal 10.

Referring again to FIG. 1A, the one or more ultrasonic wave signals generated by the ultrasonic wave emitter 11 may be generated at one or more set frequencies. In some aspects, a set frequency may be within a range of frequencies that is able to travel along various surfaces, pathways or wave guides, as well as penetrate various components of the terminal 10. In addition, the set frequency may be within a range of frequencies that allows for ultrasonic wave signals to be reflected off various surfaces or objects, and be received by microphone(s). For example, the range of frequencies may be approximately between 40 kHz and 60 kHz, although other values may be possible.

The terminal 10 may also include a signal processing unit. In addition to carrying out various processes for operating the terminal 10, the signal processing unit may be configured to receive signals from at least one microphone that correspond with the received ultrasonic echo signals, and then make a determination based on the signals whether the terminal 10 is operated, activated, or generally in contact with, or proximate, to a user or object. To do so, the signal processing unit may analyze various characteristics associated with the ultrasonic echo signals, including amplitudes, phases, timing, frequency content, direction, power or energy value, and so on. By way of example, the signal processing unit may include various components such a processor, memory and other elements and circuitry. An operation of the terminal 10 may then be adapted based on the determination. For instance, the signal processing unit may determine whether the terminal 10 has been or is being touched. If so, the signal processing unit may send an instruction to a processor of the terminal 10 indicating whether the terminal 10 has been or is being touched. The processor may then control a touch screen preventing a response, for example, to a touch action.

In some designs of the terminal 10, it may advantageous to exclude openings or holes in the housing. For instance, in some implementations, the terminal 10 may be configured to be waterproof. Additionally, it may be advantageous to avoid openings due to due to oil, dust, residues or other particulates blocking such openings. Furthermore, such openings may be aesthetically or functionally undesirable. As such, the ultrasonic wave signals emitted by the ultrasonic wave emitter 11 may be configured to penetrate various surfaces, materials or components of the terminal 10 substantially unaffected, or minimally affected, to travel to the exterior of the terminal 10. Additionally, received ultrasonic echo signals resulted from the reflection of the ultrasonic wave signals may be configured to penetrate various surfaces, materials or components to reach the microphones of the terminal 10.

Figure 2A:
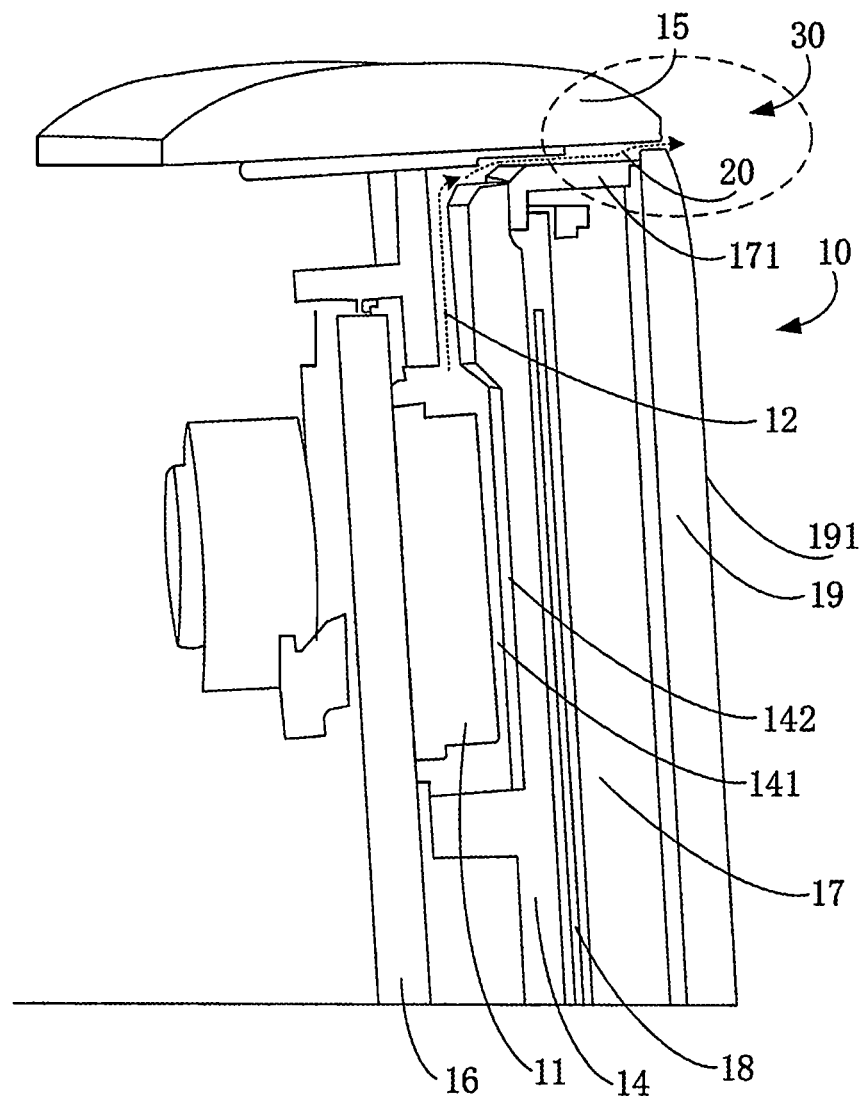
FIG. 2A is a partial perspective view illustrating a terminal according to another exemplary embodiment.
Figure 2B:
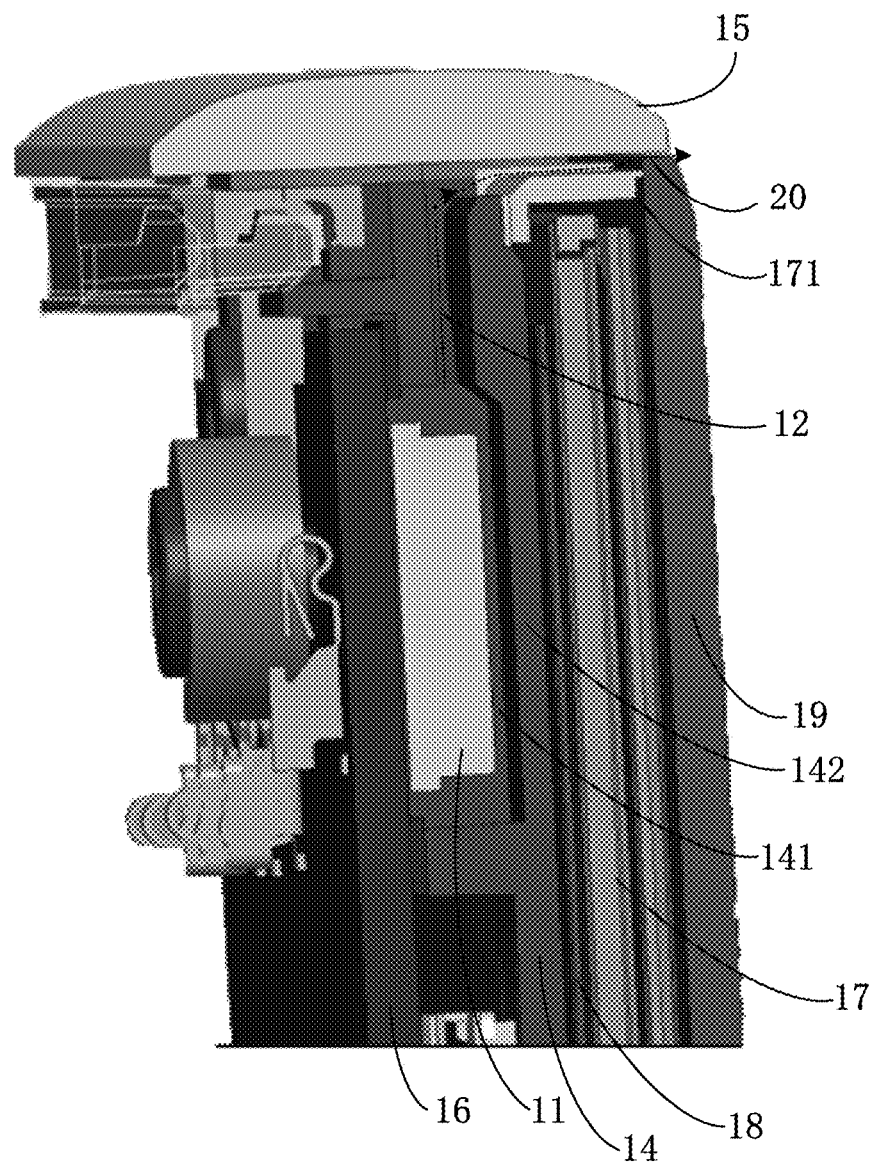
FIG. 2B is a partial perspective view illustrating a terminal shown in FIG. 2A according to an exemplary embodiment.

Referring now to FIGS. 2A and 2B, partial perspective views of an example terminal 10, in accordance with aspects of the present disclosure, are shown. As illustrated the terminal 10 may include, among other elements, an ultrasonic wave emitter 11 and at least one microphone, as well as a pad 14, a side-frame 15, a printed circuit board 16 and a display module 17. The printed circuit board 16 may include various elements and circuitry, including a processor, memory, and so forth. Various components of the terminal 10 may be partially, or completely, encased in a housing.

In particular, the side-frame 15 is positioned at a side of the terminal 10 (shown as an upper side of the terminal 10 in FIGS. 2A and 2B). In some aspects, the side-frame 15 may be part of the housing of the terminal 10, or may be configured to engage at least a portion of the housing. As shown, an ultrasonic wave signal path may be formed by the pad 14, and other elements, extending from the ultrasonic wave emitter 11 toward the side-frame 15 along a direction of dotted arrow 12 shown in FIG. 2A. In some aspects, the shape, dimensions and arrangement of the ultrasonic wave signal path may be configured such that ultrasonic wave signals produced by the ultrasonic wave emitter 11 may propagate in a controlled manner to various surfaces or the exterior of the terminal 10 via a first opening or hole, for instance. In some embodiments, the ultrasonic wave signal path may include a second opening, hole or seam formed using the pad 14. Other openings, holes or seams may be used as well. As such, the ultrasonic wave signal path may include multiple pathways for generated ultrasonic wave signals to reach the exterior of the terminal 10.

As shown in FIGS. 2A and 2B, a first side of the pad 14 may be closely contacting the printed circuit board 16, and a second side of the pad 14 may be closely contacting the display module 17. In some embodiments, a foam 18 may be interposed between the pad 16 and the display module 17, as shown. The foam 18 absorb pressure applied to the display module 17 to be relieved, such that no appreciable pressure is applied the pad 14 an avoiding distortion or undesired changes of the ultrasonic wave signal path.

In some embodiments, an accommodation space 141 may be present between the pad 14 and the ultrasonic wave emitter 11 to accommodate the ultrasonic wave emitter 11 as well as any ultrasonic wave signals produced therefrom. Space maintained between a lower end 142 of the accommodation space 141 and the ultrasonic wave emitter 11 would avoid contact with the pad 14, which would otherwise affect proper operation. In some aspects, the shape of the accommodation space 141 may corresponds to the shape ultrasonic wave emitter 11.

Figure 2C:
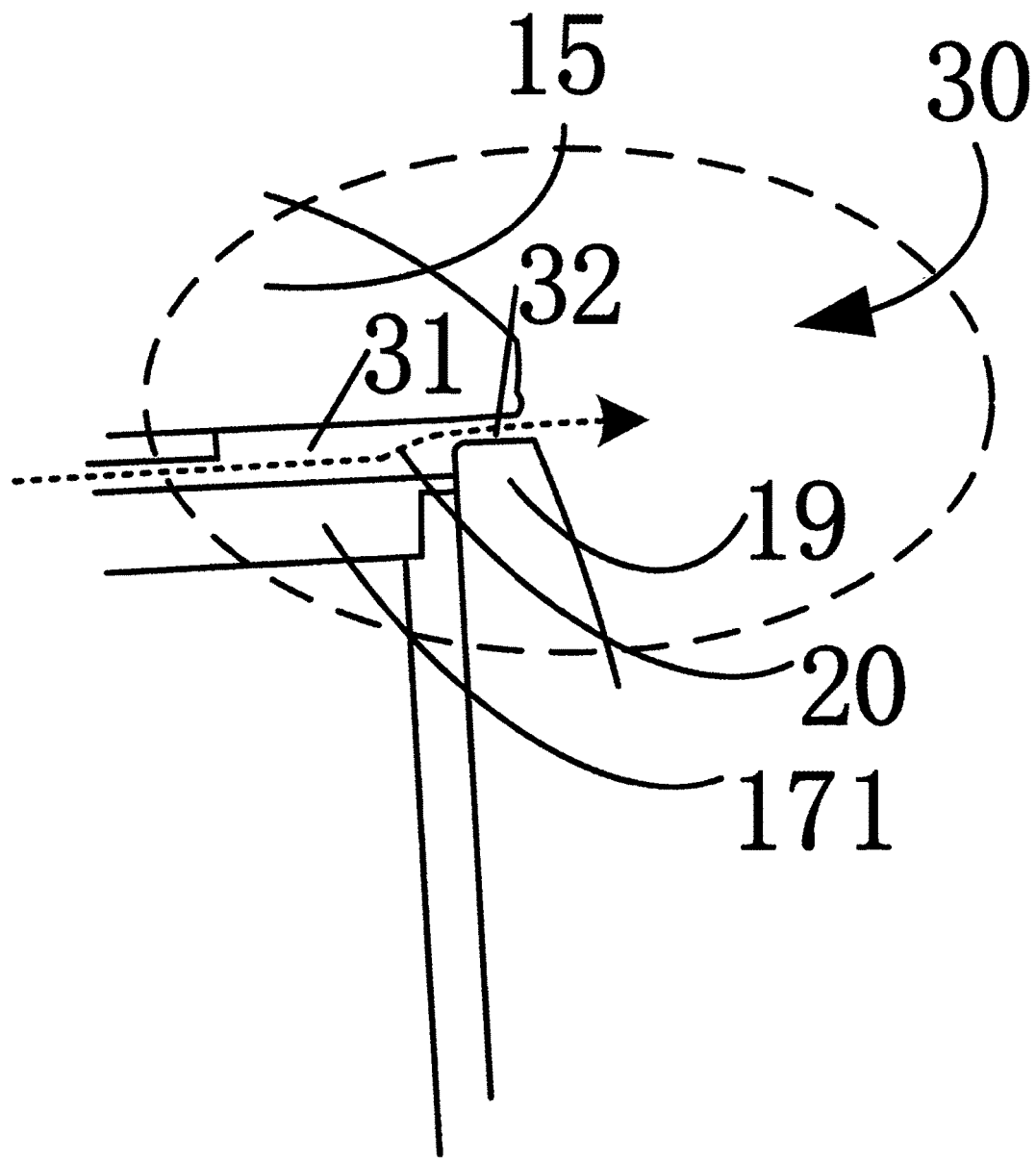
FIG. 2C is an enlarged partial perspective view illustrating a region of the terminal shown in FIG. 2A according to an exemplary embodiment.

FIG. 2C shows an enlarged region 30 in FIG. 2A. Referring to FIG. 2A and FIG. 2C, in some embodiments, a first seam 31 may be formed between the side-frame 15 and a holder 171 of the display module 17. In region 30 of FIG. 2C, a second seam 32 may be formed between the side-frame 15 and an end of a cover-glass 19 of the terminal 10. As shown, the ultrasonic wave signal path may include the first seam 31 and the second seam 32. An ultrasonic wave signal produced by the ultrasonic wave emitter 11 may propagate toward the surface 191 of the cover-glass 19 and the exterior of the terminal 10 along an ultrasonic wave signal path as indicated by the dotted arrow 12 and the dotted arrow 20, via the first seam 31 and the second seam 32. The shape and location of the ultrasonic wave signal path is not limited by the examples in the disclosure and may be adjusted or changed in different electronic devices. By way of example, a width of the second seam 32 may ranges between approximately 0.01 mm to 0.04 mm, for example, 0.02 mm. In implementations, it may be advantageous to keeping dimensions and properties of the first seam 31 and the second seam 32 such that ultrasonic wave signals may be emitted to the exterior of the terminal 10 without affecting the appearance, or other functionalities of the terminal 10.

In one non-limiting example application, a user may utilize the terminal 10 to make a call. During a process of calling, a processor of the terminal 10 may detect that the user is making the call and that the terminal 10 is hand-held (an earphone is not inserted into the terminal 10, for example). The processor may then control the ultrasonic wave emitter 11 to emit ultrasonic wave signals with the set frequency. The ultrasonic wave signals are then guided along the ultrasonic wave signal path, via reflection and/or refraction, toward the exterior of the terminal 10. As the user's face approaches the cover-glass 19, at least some of the ultrasonic wave signals may be reflected by the face, allowing ultrasonic wave echo signals to be captured by the microphone(s) of the terminal 10. The signal processing unit may then process signals received by the microphone(s) and determine whether the ultrasonic echo signals were caused by a reflection of the ultrasonic wave signal due to the user's face, other body parts, or other objects, as well as by background or other incident or reflected radiation. Generally, the amplitude of the ultrasonic echo signals produced by reflections from the user's face is significant greater compared to the background. Using at least the amplitude, a determination can then be made whether the user's face, or parts or objects, have approached the cover-glass 19. Other characteristics of the ultrasonic echo signals may also be used. A determination of the mode of operation or activation of the terminal 10 may also be made. Based on the determination, the processor may, for example, execute a function that prevents a response to the touch action on various buttons or a touch screen. Other functions, including, for example, shutting off a display, may also be executed. It is to be understood by those skilled in the art, if the terminal 10 is placed into a pocket or bag, a touch action or contact may be similarly detected, and a response to the touch action in this scenario may be provided as described, for instance, by executing a function or controlling a display.

In some implementations, ultrasonic wave signals may controlled to propagate toward the seam between the cover-glass 19 and the side-frame 15, via an ultrasonic wave signal path inside of the terminal 10, and then propagate outside of the cover-glass 19 through the seam. If the face or hair of a user approaches, ultrasonic echo signals resulting from the reflection of the ultrasonic wave signals propagates to the microphone of the terminal 10. A determination may then be made whether the ultrasonic echo signals are caused by the approach of the face, hair or other body parts or object to the cover-glass 19. A function in accordance with determination may be executed thereafter, as described.

Figure 3:
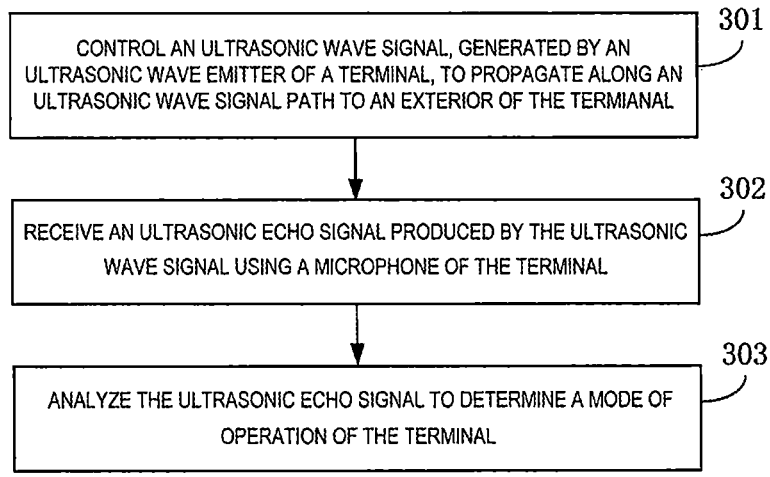
FIG. 3 is a flow chart showing a method for identifying a touch according to an exemplary embodiment.

FIG. 3 shows a flowchart setting forth steps of a process in accordance with aspects of the present disclosure. The process may be carried out using any suitable system or device, such systems and devices described in the present disclosure. In some implementations, the process may be embodied a program or instructions executable by a processor, the program or instructions being stored as in a non-transitory computer readable medium, or other data storage location.

As shown in FIG. 3, the process may begin at process block 301 with controlling an ultrasonic wave signal, generated by an ultrasonic wave emitter of a terminal or device, as described, to propagate along an ultrasonic wave signal path to an exterior of the terminal or device. At least a portion of the ultrasonic wave signal propagates to the exterior of the terminal or device. This step may include, for example, directing the ultrasonic wave emitter to emit ultrasonic wave signals at various frequencies. In some aspects, as described, the ultrasonic wave emitter may be controlled to emit ultrasonic wave signals over a range of frequencies that is able to travel along various surfaces, pathways or wave guides, as well as penetrate various components of the terminal or device. In addition, the set frequency may be within a range of frequencies that allows for ultrasonic wave signals to be reflected off various surfaces or objects and generate measurable ultrasonic echo signals. For example, the range of frequencies may be approximately between 40 kHz and 60 kHz, although other values may be possible.

Then, at process block 302, an ultrasonic echo signal produced by the ultrasonic wave signal emitted may then be received, using at least one microphone of the terminal. An analysis of the ultrasonic wave signal may then be carried out, as indicated by process block 303, to identity a mode of operation of the terminal. As described, this may include performing a number of processing steps to identify various characteristics of the received ultrasonic echo signal, including amplitude, phase, duration, frequency, power or energy value and other wave characteristics. In some aspects, a predetermined or stored background signal may be subtracted from the received ultrasonic echo signal. In addition, a direction or orientation of the received ultrasonic echo signal may also be determined, for instance, by analyzing signals captured using multiple microphones. Based on the characteristics, a determination can be made whether the received ultrasonic echo signal is a result of background or the ultrasonic wave signal emitted. In making the determination, amplitudes, phases, duration, frequencies, power, energy value, and other characteristics may be compared to one or more predetermined thresholds. In some implementations, other information, provided by various sensors on the terminal or device may be utilized in the analysis of process block 303. For example, accelerometer, temperature and other acquired data may be utilized.

As described, a determined mode of operation of the terminal or device may include a user's face, skin or hair, as well as other objects, approaching or contacting a touch screen of the terminal. In some aspects, the mode of operation may include whether the terminal or device has been activated. As described, various functions on the terminal may also be executed at process block 303 based on the determined mode of operation. For example, a function may be executed that prevents a response to the touch action on various buttons or a touch screen of the terminal or device. Other functions, including, for example, shutting off a display, may also be executed.

Figure 4:
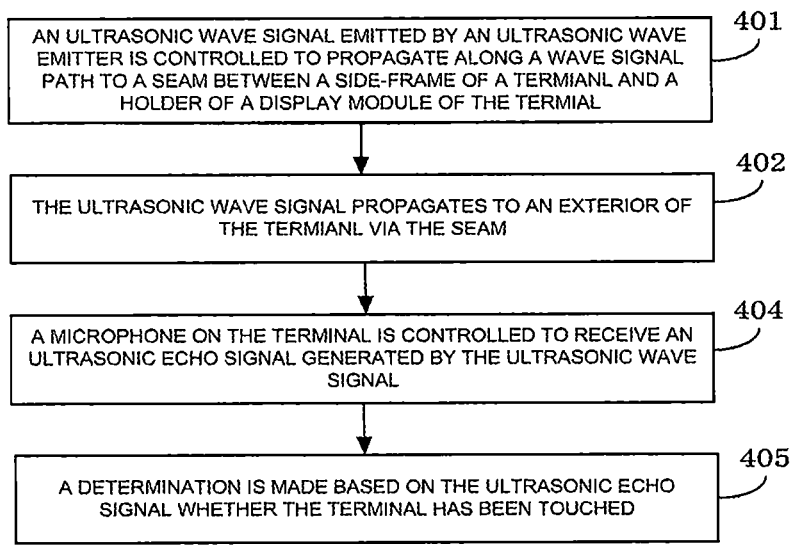
FIG. 4 is a flow chart showing a method for identifying a touch according to another exemplary embodiment.

FIG. 4 shows a flowchart setting forth steps of another process in accordance with aspects of the present disclosure. Similarly, the process may be carried out using any suitable system or device, such systems and devices described in the present disclosure. In some implementations, the process may be in the form of a program or instructions executable by a processor, the program or instructions being stored as in a non-transitory computer readable medium, or other data storage location.

At process block 401 of the process, at least one ultrasonic wave signal emitted by the ultrasonic wave emitter is controlled to propagate along an ultrasonic wave signal path leading to a seam between a side-frame of the terminal and a holder of a display module of the terminal. At process block 402, the ultrasonic wave signal propagates to an exterior of the terminal via the seam. At process block 404, at least one microphone is controlled to receive ultrasonic echo signals generated by the ultrasonic wave signal(s). At process block 405, a determination is made, based on the ultrasonic echo signal(s), whether the terminal has been touched, is being operated or otherwise activated. As described, determination of a mode of operation of the terminal may also be performed at process block 405. In some aspects, process block 405 may further include determining an amplitude of the ultrasonic echo signal, determining an energy value of the ultrasonic echo signal according to the amplitude, and determining whether the terminal is touched according to the energy value. In some aspects, determining whether the terminal is touched according to the energy value may include comparing the energy value with a predetermined threshold, determining that the terminal is touched if the energy value is greater than or equal to the predetermined threshold, and determining that the terminal is touched by mistake if the energy value is smaller than the predetermined threshold.

Figure 5:
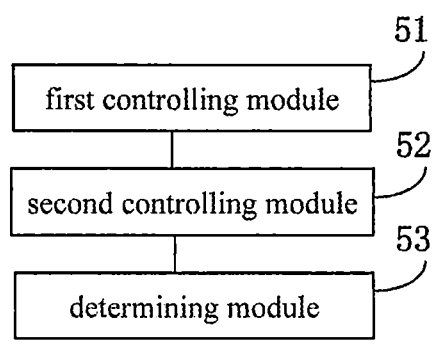
FIG. 5 is a schematic diagram illustrating an apparatus for identifying a touch according to an exemplary embodiment.

FIG. 5 is a schematic diagram illustrating an apparatus, in accordance with aspects of the present disclosure. As shown in FIG. 5, the apparatus may include a first controlling module 51, a second controlling module 52 and a determining module 53.

The first controlling module 51 may be configured to control ultrasonic wave signals emitted by an ultrasonic wave emitter to propagate from inside of a terminal to surfaces or an exterior of the terminal via one or more ultrasonic wave signal paths.

The second controlling module 52 may be configured to control at least one microphone to receive ultrasonic echo signals generated by the emitted ultrasonic wave signals.

The determining module 53 may be configured to determine a mode of operation of the terminal based on the ultrasonic echo signals received. For instance, the determining module 53 may determine whether the terminal has been touched or otherwise activated.

Figure 6:
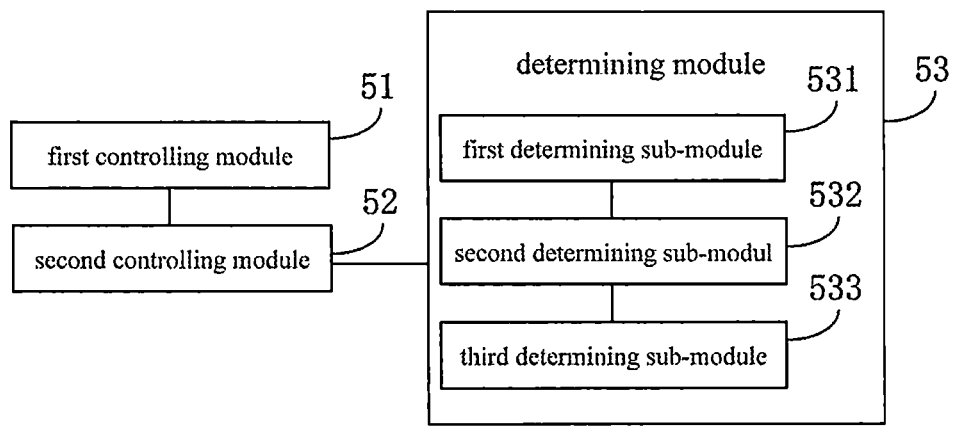
FIG. 6 is a schematic diagram illustrating an apparatus for identifying a touch according to another exemplary embodiment.

FIG. 6 is a schematic diagram illustrating an apparatus in accordance with aspects of the present disclosure. As shown in FIG. 6, in addition to a first controlling module 51 and a second controlling module 52, as described with reference to FIG. 5, the determining module 53 may include: a first determining sub-module 531, a second determining sub-module 532 and a third determining sub-module 533.

The first determining sub-module 531 may be configured to determine at least one amplitude of received ultrasonic echo signals.

The second determining sub-module 532 may be configured to determine an energy value of ultrasonic echo signals according to the amplitude determined by the first determining sub-module 531.

The third determining sub-module 533 may be configured to determine, according to the energy value determined by the second determining sub-module 532, whether the terminal has touched.

In an embodiment, the third determining sub-module 533 is configured to:
  compare the energy value with a predetermined threshold;
  determine that the terminal is touched if the energy value is greater than or equal to the predetermined threshold; and
  determine that the terminal is touched by mistake if the energy value is smaller than the predetermined threshold.

Regarding to the device in embodiments of the present disclosure, a specific manner of operating by each module has been described in detail in embodiments related to the method, which is not elaborated herein.

Figure 7:
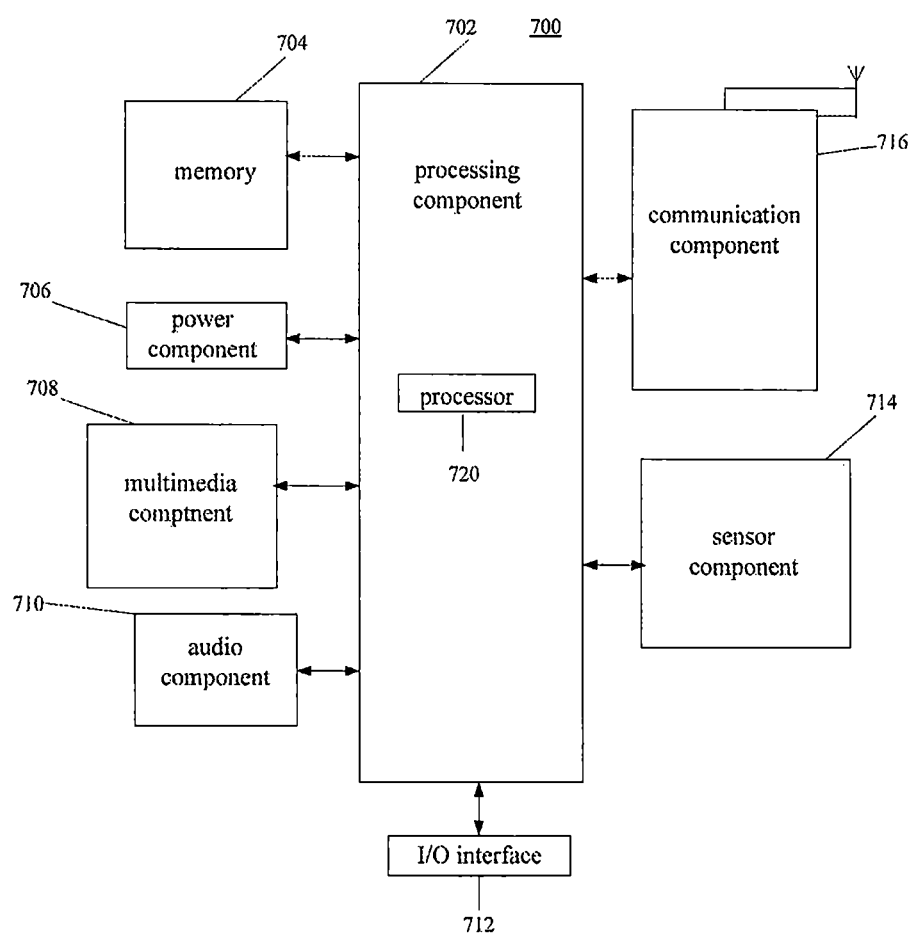
FIG. 7 is a block diagram of an electronic device according to an exemplary embodiment.

FIG. 7 is a block diagram of a device 700 in accordance with aspects of the present disclosure. By way of example, the device 700 may be a mobile phone, a computer, a digital broadcasting terminal, a messaging device, a game console, a tablet device, a medical device, fitness equipment, a Personal Digital Assistant PDA, and so on.

Referring to FIG. 7, the device 700 may include the following one or more components: a processor o processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above-described methods. For instance, the processing component 702 may be configured to direct emission of ultrasonic wave signals and the acquisition of ultrasonic echo signals. The processing component 702 may also be configured to analyze the received ultrasonic echo signals. Based on various characteristics of the received ultrasonic echo signals, the processing component 702 may then be configured to make a determination with regard to a mode of operation or activation of the device 700. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 708 includes a front camera and/or a rear camera. The front camera and/or the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes at least one microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals. As described, in some implementations, the at least one microphone may be configured to acquire ultrasonic echo signals that may be relayed to the processing component 702 for processing.

The I/O interface 712 provides an interface for the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700 and relative positioning of components (e.g. the display and the keypad of the device 700). The sensor component 714 may also detect a change in position of the device 700 or of a component in the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. In alternative embodiments, the sensor component 714 may include one or more ultrasonic wave emitters for generated ultrasonic wave signals. To this end, the sensor component 714 may have various ultrasonic wave paths included or connected thereto, as described. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate wired or wireless communication between the device 700 and other devices. The device 700 can access a wireless network based on a communication standard, such as WIFI, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 700 may use the circuitries in combination with the other hardware or software components for performing the above described methods. Each module, sub-module, unit, or sub-unit disclosed above may be implemented at least partially using the one or more circuitries.

In exemplary embodiments, there is also provided a non-transitory computer readable storage medium including instructions, such as the memory 704 including instructions. For example, the non-transitory computer-readable storage medium may be a ROM, a RAM, a CD-ROM, a magnetic tape, a floppy disc, an optical data storage device, and the like. The above instructions are executable by the processor 720 in the device 700, to perform processes described in the present disclosure.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the present disclosure as appreciated by those of ordinary skill or customary practice in the art. It is intended that the specification and examples be considered as exemplary only, with a true scope and spirit of the disclosure being indicated by the following claims.

It is to be understood that, the present disclosure is not limited to the exact embodiments that have been described above and illustrated in the accompanying drawings, and that various modifications and changes can be made without departing form the scope thereof. It is intended that the scope of the disclosure be captured by the appended claims.

What is claimed is:

1. A terminal comprising:
   an ultrasonic wave emitter arranged inside the terminal that is configured to generate an ultrasonic wave signal;
   an ultrasonic wave signal path connected to the ultrasonic wave emitter allowing the ultrasonic wave signal to propagate at least partially to an exterior of the terminal;
   at least one microphone configured to receive an ultrasonic echo signal produced by the ultrasonic wave signal using a first hole that is arranged on a side-frame of the terminal; and
   a processor configured to analyze the received ultrasonic echo signal to determine a mode of operation of the terminal,
   wherein the terminal further comprises a pad, the side-frame, a printed circuit board and a display module, wherein the side-frame is disposed at a side of the terminal, a second hole is formed as the ultrasonic wave signal path on the pad and inside the terminal, and the ultrasonic wave signal path extends to the side-frame from the ultrasonic wave emitter;
   wherein a first side of the pad is closely contacted with the printed circuit board, and a second side of the pad is closely contacted with the display module; and
   wherein a first seam is between the side-frame and a holder of the display module, a second seam is between the side-frame and an end of a cover-glass of the terminal, wherein the first seam and the second seam have substantially same widths so as to extend the ultrasonic wave signal paths orthogonally to the exterior of the terminal.

2. The terminal according to claim 1, wherein an accommodation space is disposed inside of the pad and at a position where the ultrasonic wave emitter is located, the accommodation space is configured to accommodate the ultrasonic wave emitter, and a shape of the accommodation space corresponds with a shape of the ultrasonic wave emitter.

3. The terminal according to claim 1, wherein a width of each of the first seam and the second seam ranges from 0.01 mm to 0.04 mm.

4. A method for operating a terminal, the method comprising:
   controlling an ultrasonic wave signal, generated by an ultrasonic wave emitter of a terminal, to propagate at least partially along an ultrasonic wave signal path to an exterior of the terminal, wherein the terminal comprises a pad, the side-frame, a printed circuit board and a display module, the side-frame is disposed at a side of the terminal, a second hole is formed as the ultrasonic wave signal path on the pad and inside the terminal, and the ultrasonic wave signal path extends to the side-frame from the ultrasonic wave emitter, a first side of the pad is closely contacted with the printed circuit board, and a second side of the pad is closely contacted with the display module, a first seam is between the side-frame and a holder of the display module, a second seam is between the side-frame and an end of a cover-glass of the terminal, wherein the first seam and the second seam have substantially same widths so as to extend the ultrasonic wave signal paths orthogonally to the exterior of the terminal;
   receiving an ultrasonic echo signal produced by the ultrasonic wave signal using at least one microphone of the terminal; and
   analyzing the ultrasonic echo signal to determine a mode of operation of the terminal.

5. The method according to claim 4, wherein the method further comprises
   controlling the ultrasonic wave signal generated by the ultrasonic wave emitter to propagate to a seam between a side-frame of the terminal and a holder of a display module of the terminal using the ultrasonic wave signal path; and
   propagating the ultrasonic wave signal to one or more surfaces of the terminal via the seam.

6. The method according to claim 4, wherein the method further comprises:
   determining an amplitude of the ultrasonic echo signal;
   determining an energy value of the ultrasonic echo signal according to the amplitude; and determining whether the mode of operation according to the energy value.

7. The method according to claim 6, wherein the method further comprises:
comparing the energy value with a predetermined threshold; and
determining whether the terminal has been touched if the energy value is smaller than the predetermined threshold.

8. An electronic device, comprising:
a processor; and
a memory configured to store non-transitory instructions executable by the processor;
an ultrasonic wave emitter configured to produce an ultrasonic wave signal in a set frequency;
at least one microphone configured to receive an ultrasonic echo signal due to the ultrasonic wave signal;
wherein the processor is configured to:
control the ultrasonic wave emitter to generate an ultrasonic wave signal that propagates along an ultrasonic wave signal path connecting the ultrasonic wave emitter with an exterior the electronic device, wherein the electronic device comprises a pad, the side-frame, a printed circuit board and a display module, the side-frame is disposed at a side of the electronic device, a second hole is formed as the ultrasonic wave signal path on the pad and inside the electronic device, and the ultrasonic wave signal path extends to the side-frame from the ultrasonic wave emitter, a first side of the pad is closely contacted with the printed circuit board, and a second side of the pad is closely contacted with the display module, a first seam is between the side-frame and a holder of the display module, a second seam is between the side-frame and an end of a cover-glass of the terminal, wherein the first seam and the second seam have substantially same widths so as to extend the ultrasonic wave signal paths orthogonally to the exterior of the terminal;
control a microphone to receive an ultrasonic echo signal based on the ultrasonic wave signal; and
analyze the ultrasonic wave signal to determine a mode of operation of the electronic device.

9. The electronic device according to claim 8, wherein the processor is further configured to analyze a characteristic of the ultrasonic echo signal, wherein the characteristic comprises at least one of an amplitude, a phase, a timing, a frequency content, a direction, a power, and an energy value of the ultrasonic echo signal.

10. The electronic device according to claim 8, wherein the processor is configured to:
determine an amplitude of the ultrasonic echo signal;
determine an energy value of the ultrasonic echo signal according to the amplitude; and
determine whether the terminal has been touched based on the energy value.

11. The electronic device according to claim 10, wherein the processor is configured to:
compare the energy value with a predetermined threshold; and
determine whether the terminal has been touched if the energy value is smaller than the predetermined threshold.

12. A non-transitory computer-readable storage medium having stored therein instructions that, when executed by a processor of a device, causes the device to perform a method for identifying a touch, the method including:
controlling an ultrasonic wave signal emitted by an ultrasonic wave emitter to propagate from inside of a terminal to a surface of the terminal via an ultrasonic wave signal path, wherein the terminal comprises a pad, the side-frame, a printed circuit board and a display module, the side-frame is disposed at a side of the terminal, a second hole is formed as the ultrasonic wave signal path on the pad and inside the terminal, and the ultrasonic wave signal path extends to the side-frame from the ultrasonic wave emitter, a first side of the pad is closely contacted with the printed circuit board, and a second side of the pad is closely contacted with the display module, a first seam is between the side-frame and a holder of the display module, a second seam is between the side-frame and an end of a cover-glass of the terminal, wherein the first seam and the second seam have substantially same widths so as to extend the ultrasonic wave signal paths orthogonally to the exterior of the terminal;
controlling a microphone to receive an ultrasonic echo signal of the ultrasonic wave signal; and
determining whether the terminal is touched according to the ultrasonic echo signal.

13. The non-transitory computer-readable storage medium according to claim 12, wherein controlling an ultrasonic wave signal emitted by an ultrasonic wave emitter to propagate from inside of a terminal to the surface of the terminal via an ultrasonic wave signal path comprises:
controlling the ultrasonic wave signal emitted by the ultrasonic wave emitter to propagate to a seam between a side-frame of the terminal and a holder of a display module of the terminal via the ultrasonic wave signal path; and
propagating the ultrasonic wave signal to the surface of the terminal via the seam.

14. The non-transitory computer-readable storage medium according to claim 12, wherein determining whether the terminal has been touched according to the ultrasonic echo signal comprises:
determining an amplitude of the ultrasonic echo signal;
determining an energy value of the ultrasonic echo signal according to the amplitude; and
determining whether the terminal has been touched according to the energy value.

15. The non-transitory computer-readable storage medium according to claim 14, wherein determining whether the terminal is touched according to the energy value comprises:
comparing the energy value with a predetermined threshold;
determining that the terminal is touched if the energy value is greater than or equal to the predetermined threshold; and
determining that the terminal is touched by mistake if the energy value is smaller than the predetermined threshold.

* * * * *